(12) United States Patent
Woods et al.

(10) Patent No.: US 12,471,515 B2
(45) Date of Patent: Nov. 18, 2025

(54) AGRICULTURAL IMPLEMENT WITH A SUPPORT ARM FOR REDUCING VIBRATIONS TRANSMITTED TO SENSORS

(71) Applicant: CNH Industrial America LLC, New Holland, PA (US)

(72) Inventors: Trevor J. Woods, Lewistown, IL (US); Joshua D. Knoblauch, Lowpoint, IL (US)

(73) Assignee: CNH Industrial America LLC, New Holland, PA (US)

( * ) Notice: Subject to any disclaimer, the term of this patent is extended or adjusted under 35 U.S.C. 154(b) by 308 days.

(21) Appl. No.: 18/125,272

(22) Filed: Mar. 23, 2023

(65) Prior Publication Data

US 2024/0315157 A1 Sep. 26, 2024

(51) Int. Cl.
*A01B 69/00* (2006.01)
*A01D 41/127* (2006.01)

(52) U.S. Cl.
CPC ........ *A01B 69/001* (2013.01); *A01D 41/1278* (2013.01)

(58) Field of Classification Search
None
See application file for complete search history.

(56) References Cited

U.S. PATENT DOCUMENTS

| | | | |
|---|---|---|---|
| 5,212,655 A | 5/1993 | Boehle | |
| 6,389,785 B1 | 5/2002 | Diekhans et al. | |
| 2003/0020007 A1 | 1/2003 | Andersen | |
| 2014/0262370 A1* | 9/2014 | Kohn | A01B 63/24 |
| | | | 172/140 |
| 2015/0053446 A1* | 2/2015 | Kovach | A01B 23/046 |
| | | | 172/776 |
| 2017/0079190 A1* | 3/2017 | Steinlage | A01B 73/044 |
| 2018/0325011 A1* | 11/2018 | Connell | A01B 35/04 |

FOREIGN PATENT DOCUMENTS

| | | |
|---|---|---|
| CN | 207906761 U | 9/2018 |
| DE | 102005005557 A1 | 8/2006 |
| EP | 2316259 A1 | 5/2011 |

OTHER PUBLICATIONS

Thompson et al. "Comparing Nadir and Multi-Angle View Sensor Technologies for Measuring in-Field Plant Height of Upland Cotton" Remote Sensing Mar. 23, 2019 (19 pages) https://www.mdpi.com/2072-4292/11/6/700/htm.

* cited by examiner

*Primary Examiner* — Truc M Do
(74) *Attorney, Agent, or Firm* — Dority & Manning, P.A.

(57) ABSTRACT

Agricultural implements often include one or more vision-based or chemical detection-based sensors mounted thereon to monitor various parameters associated with the performance of such agricultural operations. During the performance of agricultural operations, the implement may encounter topographical irregularities or impediments within the field. The topographical irregularities or impediments may jar the implement, thereby causing one or more components of the implement to vibrate. Such vibrations are, in turn, transmitted from the implement frame to the sensors, which may result in the data being captured by the sensors having poor quality. Therefore, an agricultural implement may include a support arm coupled thereon and configured to reduce the magnitude of the vibrations transferred to the sensors by dissipating or otherwise absorbing the vibrations being transferred to the sensors.

19 Claims, 6 Drawing Sheets

AGRICULTURAL IMPLEMENT WITH A SUPPORT ARM FOR REDUCING VIBRATIONS TRANSMITTED TO SENSORS

FIELD OF THE INVENTION

The present disclosure generally relates to agricultural implements and, more particularly, to an agricultural implement with a support arm for reducing the vibrations transmitted to sensors, such as vision-based sensors or chemical detection sensors, mounted on an agricultural implement.

BACKGROUND OF THE INVENTION

Agricultural implements, such as cultivators, disc harrows, and/or the like, perform one or more tillage operations while being towed across a field by a suitable work vehicle, such as in agricultural tractor. In this regard, agricultural implements often include one or more sensors mounted thereon to monitor various parameters associated with the performance of such agricultural operations. For example, some agricultural implements include one or more vision-based sensors (e.g., cameras) that capture images of the soil within the field or chemical detection-based sensors (e.g., anhydrous ammonia detectors) that detect the quantity of chemical applied to the soil within the field. Thereafter, such image or chemical detection data may be processed or analyzed to determine one or more parameters associated with the condition of soil. For example, the image data may be used to determined parameters related to soil roughness, residue coverage, and/or the like.

During the performance of agricultural operations, the implement may encounter topographical irregularities (e.g., ridges, bumps, holes, and/or depressions) and impediments (e.g., rocks) within the field. The topographical irregularities and impediments may jar the implement, thereby causing one or more components of the implement (e.g., the implement frame) to vibrate. Such vibrations are, in turn, transmitted from the implement frame to the vision-based and chemical detection-based sensors, which may result in the data being captured by the sensors having poor quality.

Accordingly, an improved design for reducing vibrations transmitted to sensors mounted on an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural implement. The agricultural implement may include a frame, a plurality of ground-engaging tools coupled to the frame, and a sensor configured to generate data indicative of a field parameter. The agricultural implement may also include a support arm extending along a longitudinal direction from a first end to a second end, the first end coupled to the frame and the second end being positioned aft of the frame relative to the direction of travel of the agricultural implement and coupled to the sensor. The support arm may comprise a plurality of support plates spaced apart from each other along a longitudinal direction, each support plate of the plurality of support plates including a first surface, a second surface spaced apart from the first surface along the longitudinal direction, and a third surface extending between the first surface and the second surface in the longitudinal direction, wherein the first surface and the second surface have greater surface areas than the third surface. The support arm may also comprise at least three primary structural members extending along a longitudinal direction from the first end to the second end, at least one of the at least three primary structural members coupled to the first surface and the second surface of each support plate.

In another aspect, the present subject matter is directed to an agricultural substance application implement. The agricultural substance application implement may include a frame, a dispensing tool configured to dispense anhydrous ammonia into soil of a field across which the agricultural substance application implement is traveling, and a chemical detection sensor configured to generate data indicative of a presence of the anhydrous ammonia in air above the field surface. The agricultural substance application implement may also include a support arm extending along a longitudinal direction from a first end to a second end, the first end being coupled to the frame, the second end being positioned aft of the frame relative to the direction of travel of the agricultural substance application implement and coupled to the sensor. The support arm may comprise a plurality of support plates spaced apart from each other along the longitudinal direction, each support plate of the plurality of support plates including a first surface, a second surface spaced apart from the first surface along the longitudinal direction, and a third surface extending between the first surface and the second surface in the longitudinal direction, wherein the first surface and the second surface have greater surface areas than the third surface. The support arm may also comprise at least three primary structural members extending along the longitudinal direction from the first end to the second end, at least one of the at least three primary structural members coupled to the first surface and the second surface of each support plate.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
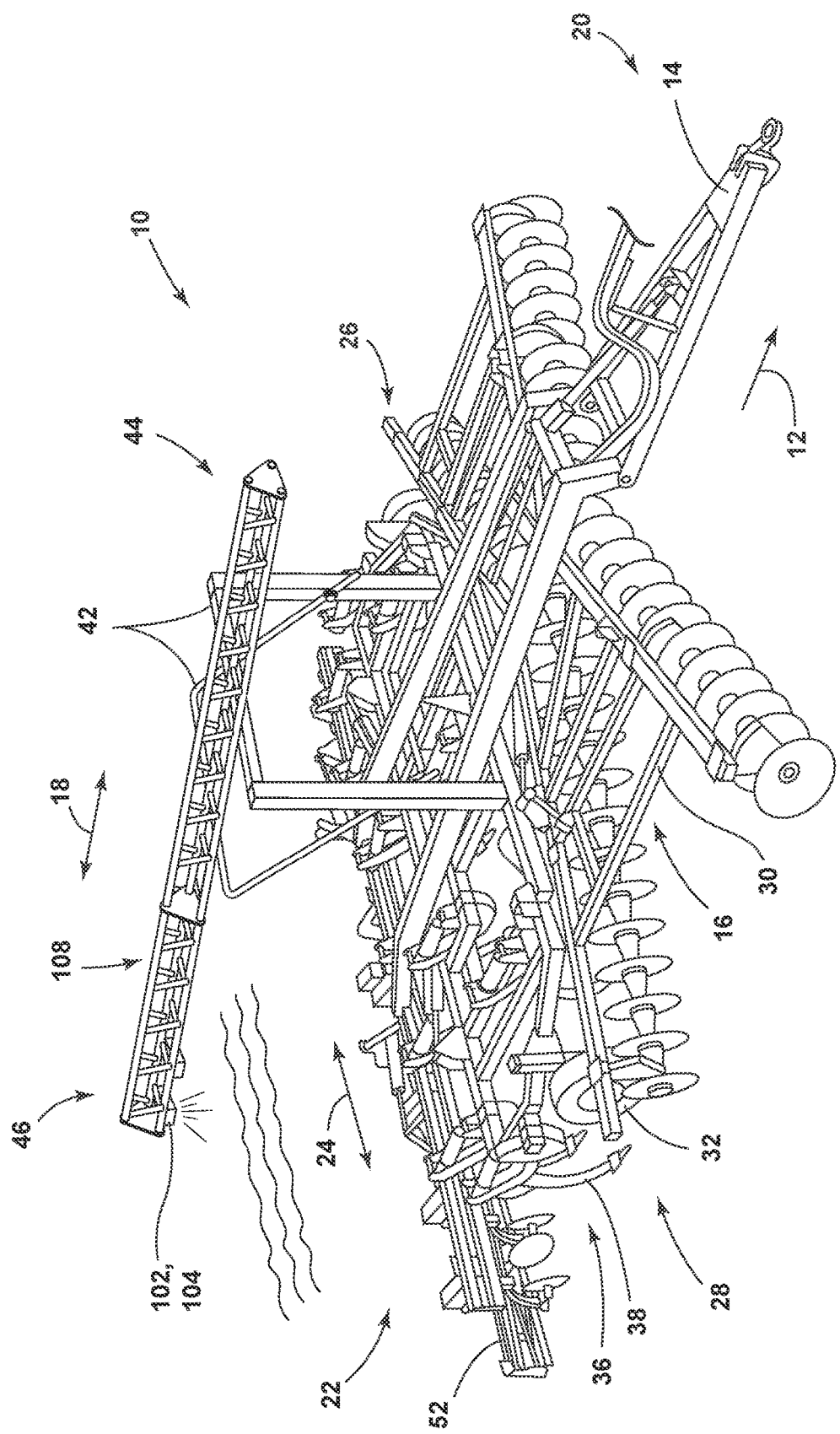
FIG. 1 illustrates a perspective view of one embodiment of an agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an agricultural implement support arm for reducing the vibrations transmitted to sensors. As will be described below, the agricultural implement may include one or more sensors mounted thereon and configured to generate data indicative of a parameter(s) of a field across which the implement is traveling. For example, in some embodiments, the sensor(s) may be a vision-based sensor(s) (e.g., a camera(s)) configured to capture image data of the field. In other embodiments, the sensor(s) may be a chemical detection sensor(s) configured to generate data indicative of a parameter associated with a presence of a chemical, such as anhydrous ammonia. In this respect, as the agricultural implement travels across the field, topographical irregularities and/or impediments may jar the implement, thereby causing the sensor(s) to vibrate.

Additionally, the disclosed agricultural implement may include components that reduce the vibrations transmitted from various portions of the implement (e.g., the implement frame, the ground-engaging tool(s)) to the sensor(s), thereby improving the quality of the data generated by such sensor(s). For example, in several embodiments, the agricultural implement may include a support arm extending along a longitudinal direction from a first end to a second end. The first end of the support arm may be coupled to the implement frame and the second end of the support arm may be positioned aft of the implement frame relative to the direction of travel of the agricultural implement. Furthermore, the second end of the support arm may be coupled to one or more of the sensors. Moreover, the support arm may include one or more support plates spaced apart from each other along the longitudinal direction, with each support plate including a first surface and a second surface spaced apart from the first surface along the longitudinal direction. Additionally, each support plate may include a third surface extending between the first surface and the second surface in the longitudinal direction, with the first surface and the second surface having greater surface areas than the third surface. Furthermore, the support arm may include at least three primary structural members extending along the longitudinal direction from the first end to the second end. At least one of the primary structural members is, in turn, coupled to the first surface and the second surface of each support plate.

The at least three primary structural members and the support plates increase the rigidity of the support arm, thereby allowing the support arm to prevent movement of the implement frame from being transmitted to the sensor(s). More specifically, positioning support plates at intervals along the longitudinal direction increase the rigidity of the primary structural members. This increased rigidity reduces or prevents vibrations and other movement of the implement frame caused by jarring from or impact with topographical irregularities and/or impediments within the field from being transmitted to the sensor(s). In this respect, by reducing or preventing movement of the sensor(s), the support arm improves the quality of the data being captured by the sensor(s), which, in turn, allow for improved control of the implement.

Referring now to the drawings, FIG. 1 illustrates a perspective view of one embodiment of an agricultural implement 10 in accordance with aspects of the present subject matter. As shown, in the illustrated embodiment, the agricultural implement 10 is configured as a tillage implement, such as a disk ripper. However, in alternative embodiments, the agricultural implement 10 may be configured as any other suitable type of implement, such as another type of tillage implement, an agricultural substance application implement, or the like.

In general, the agricultural implement 10 is configured to be towed across a field in a direction of travel (e.g., as indicated by arrow 12) by a work vehicle (not shown), such as a tractor or other agricultural work vehicle. For example, the agricultural implement 10 may be coupled to the work vehicle via a hitch assembly 14 or using any other suitable attachment means.

Furthermore, the agricultural implement 10 includes an implement frame 16. As shown, the frame 16 extends along a longitudinal direction 18 between a forward end 20 and an aft end 22. The frame 16 also extends along a lateral direction 24 between a first side 26 and a second side 28. In this respect, the frame 16 generally includes a plurality of structural frame members 30, such as beams, bars, and/or the like, configured to support or couple to a plurality of components. Additionally, a plurality of wheels are coupled to the frame 16, such as a set of centrally located wheels 32, to facilitate towing the agricultural implement 10 in the direction of travel 12.

In one embodiment, the frame 16 is configured to support a cultivator 36 configured to till or otherwise break the soil over which the agricultural implement 10 travels to create a seedbed. In this respect, the cultivator 36 includes a plurality of shanks 38, which are pulled through the soil as the agricultural implement 10 moves across the field in the direction of travel 12. The shanks 38 are configured to be pivotally mounted to the frame 16 to allow the shanks 38 to pivot out of the way of rocks or other impediments in the soil.

Furthermore, in one embodiment, the agricultural implement 10 optionally includes one or more baskets or rotary firming wheels 52. In general, the baskets 52 are configured to reduce the number of clods in the soil and/or firm the soil over which the agricultural implement 10 travels. The baskets 52 are also configured to be pivotally coupled to the frame 16 or any other suitable location of the agricultural implement 10. It should be appreciated that the agricultural implement 10 may include any suitable number of baskets 52. In fact, some embodiments of the agricultural implement 10 may not include any baskets 52.

It should further be appreciated that the embodiment of the agricultural implement 10 described above and shown in FIG. 1 is provided only to place the present subject matter in an exemplary field of use. Thus, it should be appreciated that the present subject matter may be readily adaptable to any manner of implement configuration.

Additionally, in several embodiments, the agricultural implement 10 includes one or more sensor(s) 102 coupled thereto and/or supported thereon for generating data indicative of a field parameter. For example, the sensor(s) 102 may be coupled to the agricultural implement 10 and positioned aft of the frame 16 relative to the direction of travel 12 of the agricultural implement 10. However, the sensor(s) 102 may be coupled to or supported by any other suitable location for generating data indicative of the field parameter.

In several embodiments, each sensor 102 is a vision-based sensor 104 configured to capture image data and and/or other vision-based data from the field (e.g., of the soil present within the field) across which the agricultural implement 10 is moved. Specifically, in several embodiments, the vision-based sensor(s) 104 is coupled to a support arm 108 of the agricultural implement 10 described below such that the vision-based sensor(s) 104 has a field of view or sensor detection range directed towards a portion(s) of the field adjacent to the agricultural implement 10.

Moreover, it should be appreciated that the vision-based sensor(s) 104 may correspond to any suitable sensing device(s) configured to detect or capture image data or other vision-based data (e.g., point cloud data) associated with the soil or plants present within an associated field of view. For example, in several embodiments, the vision-based sensor(s) 104 may correspond to a suitable camera(s) configured to capture two-dimensional or three-dimensional images of the soil surface or the plants present with in the associated field of view. In other embodiments, the vision-based sensor(s) 104 may correspond to a LiDAR sensor(s) configured to capture point cloud data associated with the soil or plants present within an associated field of view. However, in alternative embodiments, the vision-based sensor(s) 104 may correspond to a Radio Detection and Ranging (RADAR) sensor(s) or any other suitable vision-based sensing device(s).

As mentioned above, the agricultural implement 10 includes the support arm 108, which is coupled to the frame 16. In general, the support arm 108 is configured to reduce the magnitude of the vibrations transferred from the implement frame 16 to one or more sensors 102. When the agricultural implement 10 is jarred (e.g., by hitting a rock or bump in the field), the shock impulses caused by such jarring may incite or otherwise create vibrations within one or more components of the agricultural implement 10, such as the frame 16. In this regard, the rigidity of the support arm 108 reduces or eliminates the transmission of the vibrations from the frame 16 to the sensor(s) 102. Specifically, when vibrations are incited within the frame 16, the support arm 108 is configured to reduce the magnitude of the vibrations transferred to the sensor(s) 102.

In several embodiments, the support arm 108 includes a first end 44 and a second end 46 and extends along the longitudinal direction 18 from the first end 44 to the second end 46. The first end 44 of the support arm 108 is coupled to the frame 16 of the agricultural implement 10. The second end 46 of the support arm 108 extends aft of the frame 16 relative to the direction of travel 12 of the agricultural implement 10 and is coupled to the sensor(s) 102. As such, the sensor(s) 102 is positioned aft of the frame 16 and any components supported by the frame 16. For example, as shown in FIG. 1, the vision-based sensor 104 is coupled to the second end 46 of the support arm 108 positioned aft of the frame 16 to allow the vision-based sensor 104 to capture image data of a section of the field disposed aft of the agricultural implement 10. In this respect, the vision-based sensor 104 may be positioned above a field surface with few or no obstructions.

In several embodiments, the support arm 108 is coupled to the frame 16 via a mounting assembly 42. For example, the support arm 108 may be supported by a mounting assembly 42 coupled to the support arm 108 and the agricultural implement 10. However, the support arm 108 may be coupled to the implement frame 16 directly or in any other suitable manner.

It should be appreciated that the embodiment of the agricultural implement 10 described above, specifically regarding the configuration, location, etc. of the support arm 108, is at least similar, if not identical, to the embodiment of the agricultural implement 10 shown in FIG. 6, which will be described in further detail below. It should also be appreciated that the agricultural implement 10 may include any number of support arms 108 coupled to the frame 16 or otherwise and coupled to any number or type of sensors 102.

Figure 2:
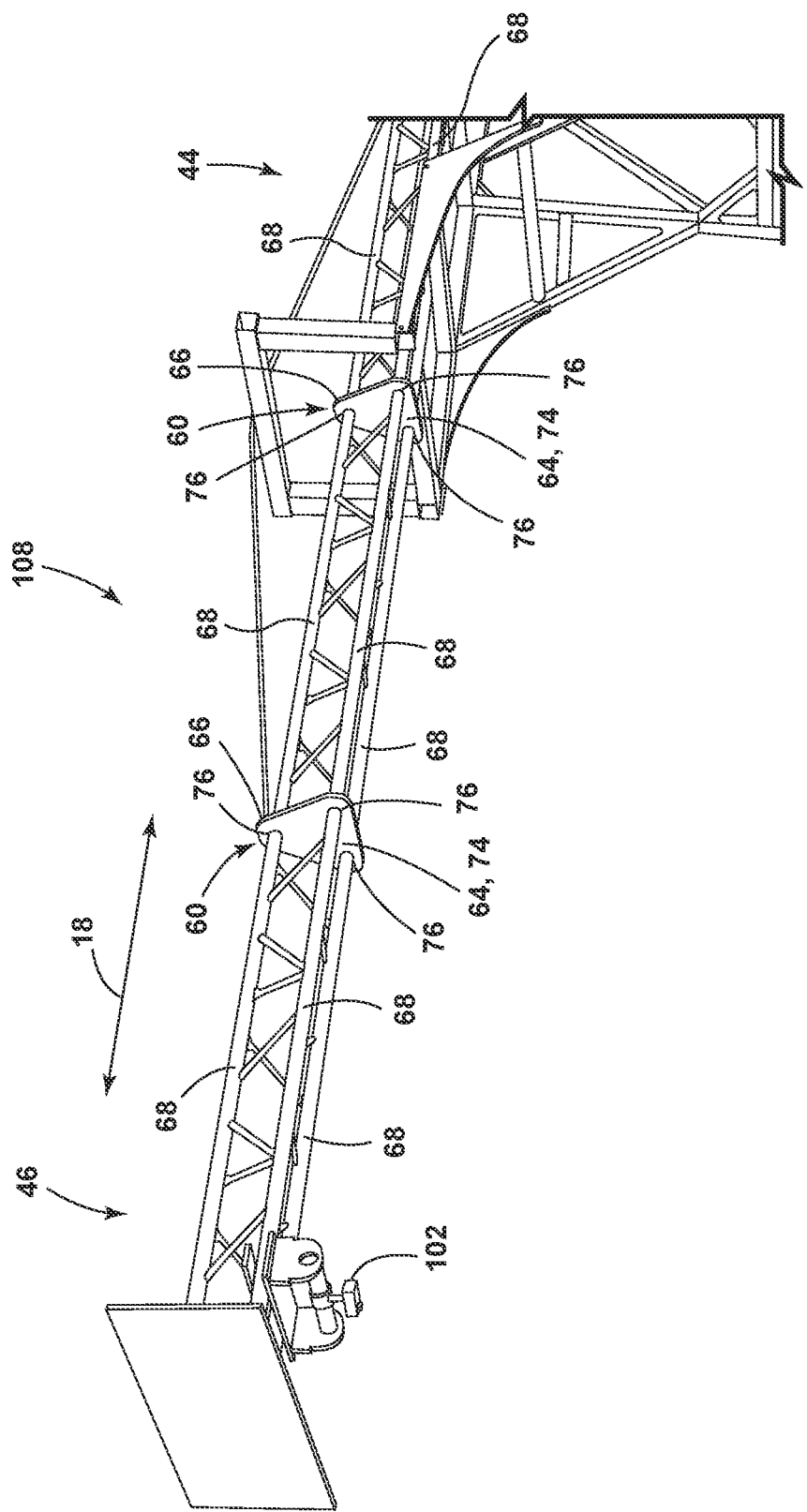
FIG. 2 illustrates a perspective view of one embodiment of a support arm of an agricultural implement for reducing vibrations transmitted to sensors in accordance with aspects of the present subject matter.
Figure 3:
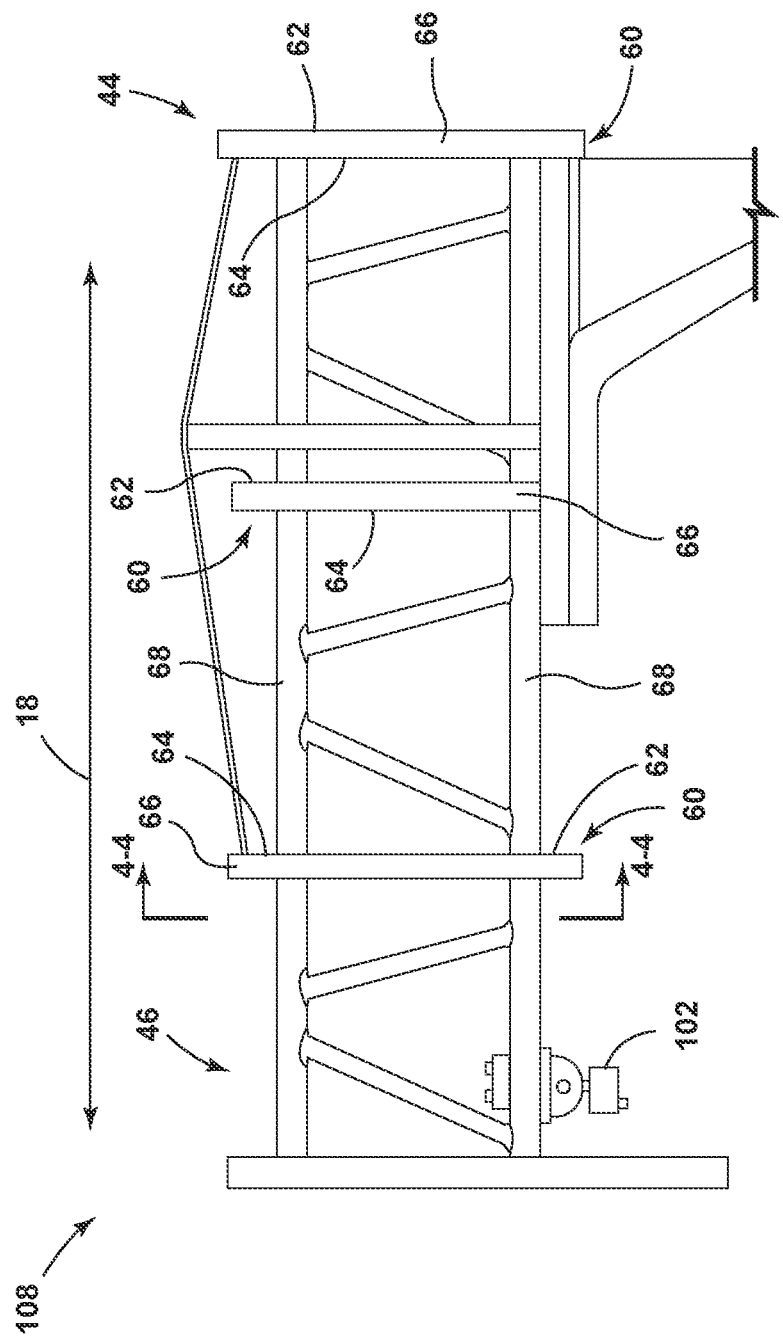
FIG. 3 illustrates a side view of the embodiment of the support arm shown in FIG. 2.

Referring now to FIGS. 2 and 3, differing views of one embodiment of a support arm 108 of an agricultural implement 10 for reducing vibrations transmitted to sensors are illustrated in accordance with aspects of the present subject matter. More specifically, FIG. 2 illustrates a perspective view of the support arm 108. Additionally, FIG. 3 illustrates a side view of the support arm 108.

In general, the support arm 108 will be described herein with reference to the embodiment of the agricultural implement 10 described above with reference to FIG. 1. However, it should be appreciated by those of ordinary skill in the art that the disclosed support arm 108 may generally be utilized with agricultural implements having any other suitable implement configuration.

As shown in FIGS. 2 and 3, the support arm 108 includes at least three primary structural members 68. In general, the primary structural members 68 form the primary structure of the support arm 108. In this respect, each primary structural member 68 extends from the first end 44 of the support arm 108 to the second end 46 of the support arm 108. Additionally, in the illustrated embodiment, the primary structural members 68 are positioned in a triangular arrangement. That is, in such an embodiment, the cross-sections of the primary structural members 68 form the vertices 76 (FIG. 2) of a triangle 74 (FIG. 2). However, in alternative embodiments, the primary structural members 68 may be arranged in any other suitable manner. Moreover, in other embodiments, the support arm 108 may include more than three primary structural members 68, such as four or more primary structural members 68.

The primary structural members 68 may have any suitable configuration that allows the primary structural members 68 to function as the primary support structure of the support arm 108. For example, in one embodiment, each primary structural member 68 may be configured as hollow tube having a circular cross-section. However, in alternative embodiments, each structural member 68 may be solid or have any other suitable cross-sectional shape, such as a square or elliptical cross-sectional shape.

Furthermore, the support arm 108 includes a plurality of support plates 60. In general, the support plates 60 reinforce the primary structural members 68 to increase rigidity of the support arm 108. Specifically, in several embodiments, the support plates 60 are spaced apart from each other along the longitudinal direction 18 between the first end 44 and the second end 46 of the support arm 108. Moreover, the support plates 60 are coupled to each of the primary structural members 68. Thus, in such embodiments, the support plates 60 couple the primary structural members 68 together, thereby increasing the rigidity of the support arm 108.

Additionally, each support plate 60 includes a first surface 62 (FIG. 3) and a second surface 64 spaced apart from the first surface 62 (FIG. 3) along the longitudinal direction 18. For example, the first surface 62 (FIG. 3) may correspond to a first side of the support plate(s) 60 and the second surface 64 may correspond to a second side of the support plate(s) 60. In some embodiments, the first surface 62 (FIG. 3) and the second surface 64 are dimensionally equivalent (e.g., identical shape).

Furthermore, each support plate 60 includes a third surface 66 extending between the first surface 62 (FIG. 3) and the second surface 64 in the longitudinal direction 18. For example, the third surface 66 may correspond to a third side of the support plate(s) 60 separating the first surface 62 (FIG. 3) from the second surface 64. As such, the third surface 66, for example, may connect the first surface 62 (FIG. 3) and the second surface 64.

Moreover, the first surface 62 (FIG. 3) and the second surface 64 of each support plate 60 have greater surface areas than the third surface 66. For example, the third surface area may have a lesser surface area than the first surface area and the second surface area such that a gap between the first surface area and the second surface area is thin relative to the first surface area and the second surface area.

In some embodiments, the first surfaces 62 of the plurality of support plates 60 are parallel to each other. In some further embodiments, the second surfaces 64 (FIG. 3) of the plurality of support plates 60 are parallel to each other. In some other further embodiments, the third surfaces 66 of the plurality of support plates 60 are parallel to each other. In these respects, each support plate 60 are parallel with each of the other support plates 60.

Figure 4:
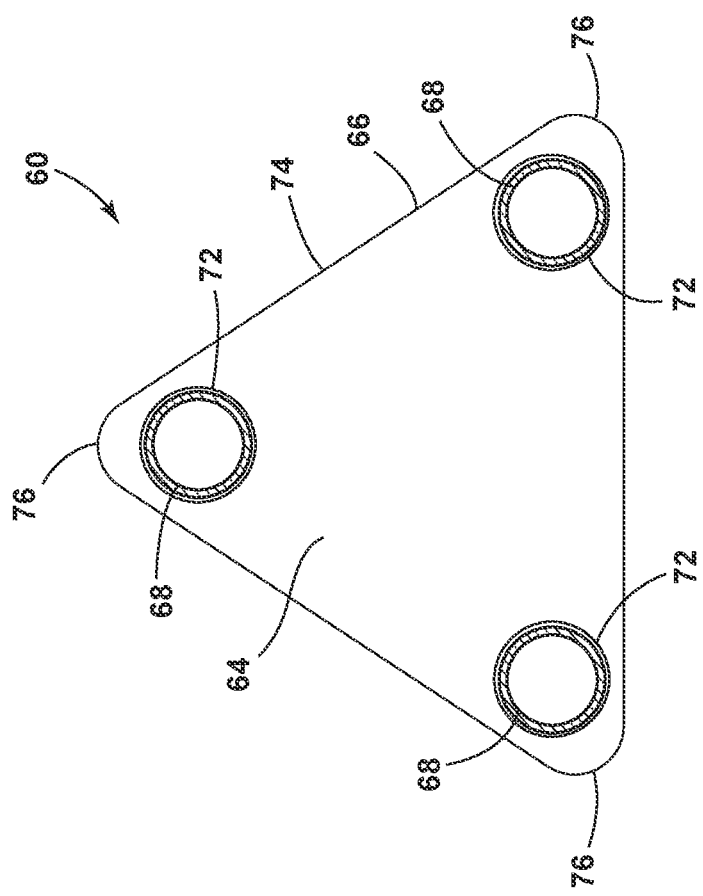
FIG. 4 illustrates a cross-sectional view of the embodiment of the support arm taken generally about Line 4-4 in FIG. 3.

Referring now to FIG. 4, a cross-sectional view of the embodiment of the support arm taken generally about Line 4-4 in FIG. 3 is illustrated in accordance with aspects of the present subject matter. In general, the support arm 108 will be described herein with reference to FIGS. 1-3.

As shown, at least one of the at least three primary structural members 68 is coupled to the first surface 62 (FIG. 3) and the second surface 64 of each support plate 60. For example, the support plates 60 may each define at least three holes 72 therethrough the first surface 62 (FIG. 3) and the second surface 64. In this respect, one of the primary structural members 68 may extend through each hole 72 and be coupled (e.g., welded) to the first surface 62 (FIG. 3) and the second surface 64 of each support plate 60. However, the at least three primary structural members 68 may be coupled at any other suitable location to increase rigidity of the support arm 108. For example, the at least three primary structural members 68 may be coupled to the third surface 66 of each support plate 60.

In addition, as indicated above, each support plate 60 may define a triangular shape 74. For example, the first surface 62 (FIG. 3) and the second surface 64 may each define equivalent triangular shapes 74. Furthermore, each support plate 60 includes three vertices 76. Each primary structural member 68 is coupled to the first surface 62 (FIG. 3) and the second surface 64 of each support plate 60 adjacent to each vertex 76 of the three vertices 76. For example, as mentioned previously, the support plates 60 may each define at least three holes 72 through the first surface 62 (FIG. 3) and the second surface 64 of each support plate 60, each hole 72 of which one primary structural member 68 extends therethrough. As such, the at least three primary structural members 68 may each be welded to the first surface 62 (FIG. 3) and the second surface 64 of each support plate 60. Additionally, each hole 72 may be adjacent to each vertex 76 of each support plate 60 to increase the rigidity of the at least three primary structural members 68, thereby reducing vibrations transmitted to the sensor(s) 102 (FIGS. 1-3) coupled to the support arm 108. However, the at least three primary structural members 68 may be coupled at any other suitable location to increase rigidity of the support arm 108. For example, the at least three primary structural members 68 may each be coupled to the third surface 66 of each support plate 60 at each vertex 76.

Figure 5:
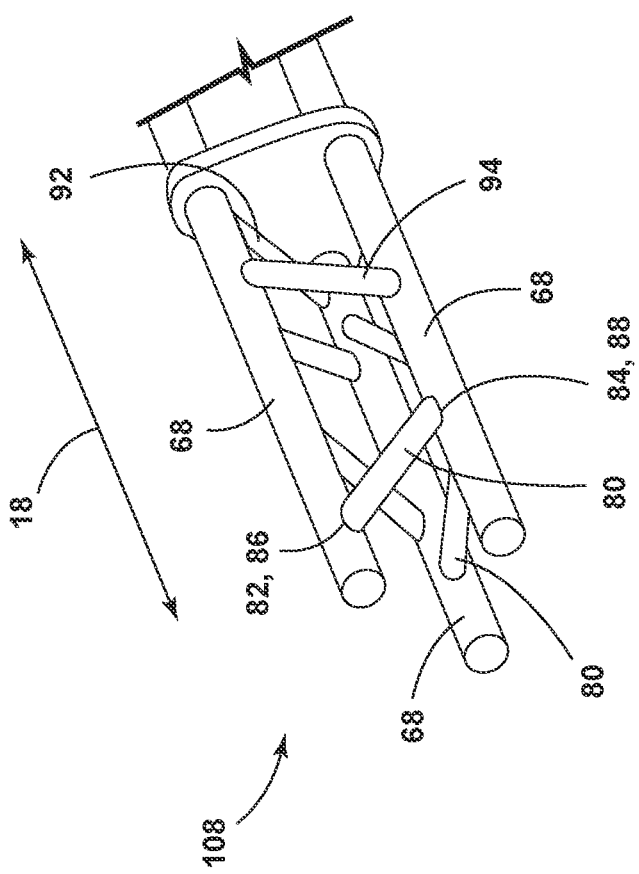
FIG. 5 illustrates a partial perspective view of a portion of the embodiment of the support arm shown in FIG. 2.

Referring now to FIG. 5, a partial perspective view of a portion of the embodiment of the support arm shown in FIG. 2 is illustrated in accordance with aspects of the present subject matter. In general, the support arm 108 will be described herein with reference to FIGS. 1-4.

As shown, the support arm 108 includes one or more secondary structural members 80. For example, each secondary structural member 80 may be a metal structural rod. Each secondary structural member 80 is coupled (e.g., welded) to and extends from one of the at least three primary structural members 68 to another of the at least three primary structural members 68. In this respect, each secondary structural member 80 supports the at least three primary structural members 68 to increase rigidity of the at least three primary structural members 68 and the support arm 108. The secondary structural member(s) 80 are coupled to and extend from each of the at least three primary structural members 68 to any other of the at least three primary structural members 68.

Moreover, the secondary structural member(s) 80 include a first end 82 and a second end 84. The first end 82 is coupled to one of the at least three primary structural members 68 at a first position 86 and the second end 84 is coupled to one of the at least three primary structural members 68 at a second position 88. Furthermore, the first position 86 and the second position 88 are spaced apart along the lengthwise direction 18. For example, each of the secondary structural members 80 may be oriented at an oblique angle relative to any of the three primary structural members 68. As such, the first end 82 of each secondary structural member 80 and each corresponding first position 86 may define a first oblique angle 92 and the second end 84 and each corresponding second position 88 may define a second oblique angle 94. In this respect, the secondary structural member(s) 80 further increase the rigidity of the at least three primary structural members 68 by ensuring that not only perpendicular forces occur between each of the secondary structural members 80 and each of the primary structural members 68. The secondary structural member(s) 80 thereby reduce vibrations transmitted to the sensor(s) 102 (FIGS. 1-3) coupled to the support arm 108 by dissipating vibrations transmitted to the sensor(s) 102 (FIGS. 1-3).

Figure 6:
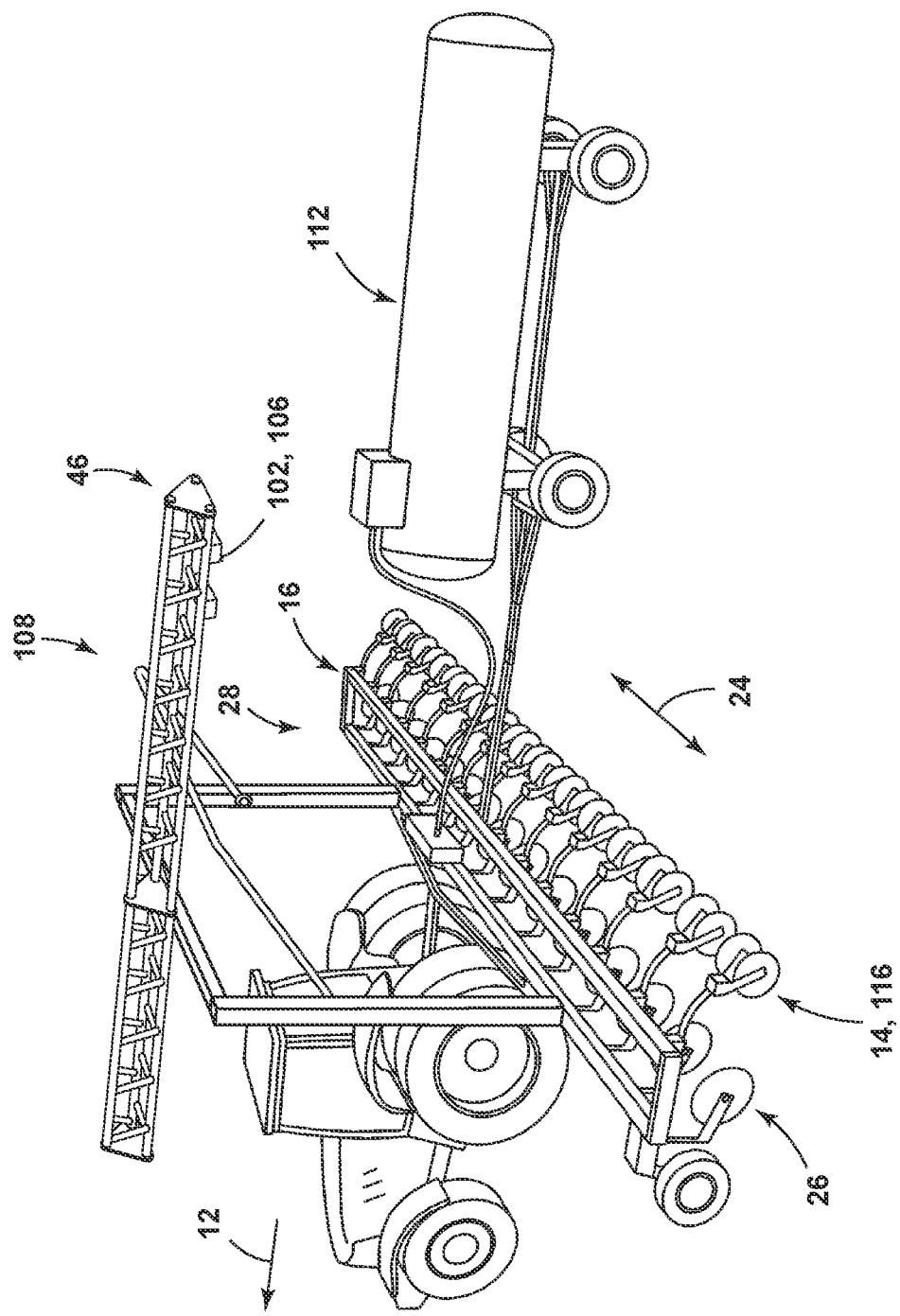
FIG. 6 illustrates a perspective view of another embodiment of an agricultural implement in accordance with aspects of the present subject matter, particularly illustrating a support arm for reducing vibrations transmitted to sensors coupled to a frame of the implement.

Referring now to FIG. 6, a perspective view of another embodiment of an agricultural implement 10 is illustrated in accordance with aspects of the present subject matter. As shown, in the illustrated embodiment, the agricultural implement 10 is configured as an agricultural substance application implement. However, as indicated above, the agricultural implement 10 may be configured as any other suitable type of agricultural implement.

As shown, the agricultural implement 10 includes a frame 16 extending in a lateral direction 24 between a first side 26 and a second side 28. The frame 16, in turn, supports a plurality of row units 114 configured to dispense an agricultural substance (e.g., anhydrous ammonia) into or onto the field. For example, each row unit 114 may include a knife or other opener configured to open a trench in the soil. Additionally, each row unit 114 may include one or more dispensing tools (not shown) configured to dispense the agricultural substance into the opened trench. Moreover, each row unit 114 may include a closing assembly 116 that collapses or otherwise closes the trench after the agricultural substance has been dispensed into the trench. However, it should be appreciated that the embodiment of the agricultural implement 10 described above and shown in FIG. 6 is provided only to place the present subject matter in an exemplary field of use. Thus, it should be appreciated that the present subject matter may be readily adaptable to any manner of implement configuration.

Additionally, a supply tank 112 may be coupled to the agricultural implement 10. In this respect, as the agricultural implement 10 proceeds in the direction of travel 12, fertilizer (e.g., anhydrous ammonia) from the supply tank 112 is supplied via a distribution system (not shown) to the dispensing tools (not shown), which, in turn, dispense the fertilizer into the soil as the agricultural implement 10 travels across the field.

Additionally, like the embodiment of the agricultural implement 10 shown in FIG. 1, the agricultural implement 10 shown in FIG. 6 includes one or more sensor(s) 102 coupled thereto and/or supported thereon for generating data indicative of a field parameter. For example, the sensor(s) 102 may be coupled to the agricultural implement 10 and positioned aft of the frame 16 relative to the direction of travel 12 of the agricultural implement 10. However, the sensor(s) 102 may be coupled to or supported by any other suitable location for generating data indicative of the field parameter.

However, unlike the embodiment of the agricultural implement 10 shown in FIG. 1, in the embodiment of the agricultural implement 10 shown in FIG. 6, the sensor(s) 102 is configured as a chemical detection sensor(s) 106. The chemical detection sensor(s) 106 is configured to generate data indicative of a parameter associated with a presence of a chemical (e.g., anhydrous ammonia) within the air adjacent to the surface of the field across which the agricultural implement 10 is moved.

Moreover, the chemical detection sensor(s) 106 may correspond to any suitable sensing device(s) configured to generate data indicative of a parameter associated with the presence of a chemical within the air present within an associated detection range. For example, in several embodiments, the chemical detection sensor(s) 106 may correspond to a suitable anhydrous ammonia detector configured to detect anhydrous ammonia within the air present within the associated detection range. However, in alternative embodiments, the chemical detection sensor(s) 106 may be configured to detect any other suitable chemical.

Additionally, like the embodiment of the agricultural implement 10 shown in FIG. 1, the agricultural implement 10 shown in FIG. 6 includes the support arm 108 coupled to the frame 16. In general, the support arm 108 is the same as or substantially similar to the support arm 108 coupled to the implement 10 shown in FIG. 1. In this respect, the chemical detection sensor(s) 106 is coupled to the second end 46 of the support arm 108 such that the chemical detection sensor(s) 106 is positioned aft of the frame 16 and any components supported by the frame 16. As such, the support arm 108 is configured to reduce the magnitude of the vibrations transferred from the implement frame 16 to the chemical detection sensor(s) 106. In general, when the agricultural implement 10 is jarred (e.g., by hitting a rock or bump in the field), such shock impulses caused by such jarring may incite or otherwise create vibrations within one or more components of the agricultural implement 10, such as the frame 16. In this regard, the rigidity of the support arm 108 reduces or prevents the transmission of vibrations of the frame 16 to the chemical detection sensor(s) 106.

It should be appreciated that the agricultural implement 10 may include any number of support arms 108 coupled to the frame 16 or otherwise and coupled to any number or type of chemical detection sensors 106 or any number or type of other sensors 102.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural implement, comprising:
    a frame;
    a plurality of ground-engaging tools coupled to the frame;
    a sensor configured to generate data indicative of a field parameter; and
    a support arm extending along a longitudinal direction from a first end to a second end, the first end being coupled to the frame, the second end being positioned aft of the frame relative to a direction of travel of the agricultural implement and coupled to the sensor, the support arm comprising:
        a plurality of support plates spaced apart from each other along the longitudinal direction, each support plate of the plurality of support plates including a first surface, a second surface spaced apart from the first surface along the longitudinal direction, and a third surface extending between the first surface and the second surface in the longitudinal direction, the first surface and the second surface having greater surface areas than the third surface; and
        at least three primary structural members extending along the longitudinal direction from the first end to the second end, at least one of the at least three primary structural members coupled to the first surface and the second surface of each support plate.

2. The agricultural implement of claim 1, wherein each support plate of the plurality of support plates defines a triangular shape.

3. The agricultural implement of claim 2, wherein each support plate comprises three vertices, each primary structural member being coupled to the first surface and the second surface of each support plate adjacent to each vertex of the three vertices.

4. The agricultural implement of claim 1, wherein the support arm further comprises:
    a secondary structural member coupled to and extending from one of the at least three primary structural members to another of the at least three primary structural members.

5. The agricultural implement of claim 4, wherein the secondary structural member further comprises:
    a first end coupled to one of the at least three primary structural members at a first position and a second end coupled to another of the at least three primary structural members at a second position, wherein the first and the second positions are spaced apart along the longitudinal direction.

6. The agricultural implement of claim 1, wherein the first surfaces of the plurality of support plates are parallel to each other.

7. The agricultural implement of claim 1, wherein the third surfaces of the plurality of support plates are parallel to each other.

8. The agricultural implement of claim 1, wherein the sensor comprises a vision-based sensor.

9. The agricultural implement of claim 8, wherein the vision-based sensor comprises a camera.

10. The agricultural implement of claim 8, wherein the vision-based sensor comprises a light detection and ranging (LiDAR) sensor.

11. The agricultural implement of claim 1, wherein the sensor comprises a chemical detection sensor configured to generate data indicative of a parameter associated with a presence of a chemical.

12. The agricultural implement of claim 11, wherein the chemical comprises anhydrous ammonia.

13. An agricultural substance application implement, comprising:
   a frame;
   a dispensing tool configured to dispense anhydrous ammonia into soil of a field across which the agricultural substance application implement is traveling;
   a chemical detection sensor configured to generate data indicative of a presence of the anhydrous ammonia in air above the field surface; and
   a support arm extending along a longitudinal direction from a first end to a second end, the first end being coupled to the frame, the second end being positioned aft of the frame relative to a direction of travel of the agricultural substance application implement and coupled to the chemical detection sensor, the support arm comprising:
      a plurality of support plates spaced apart from each other along the longitudinal direction, each support plate of the plurality of support plates including a first surface, a second surface spaced apart from the first surface along the longitudinal direction, and a third surface extending between the first surface and the second surface in the longitudinal direction, the first surface and the second surface having greater surface areas than the third surface; and
      at least three primary structural members extending along the longitudinal direction from the first end to the second end, at least one of the at least three primary structural members coupled to the first surface and the second surface of each support plate.

14. The agricultural substance application implement of claim 13, wherein each support plate of the plurality of support plates define a triangular shape.

15. The agricultural substance application implement of claim 14, wherein each support plate comprises three vertices, each primary structural member being coupled to the first surface and the second surface of each support plate adjacent to each vertex of the three vertices.

16. The agricultural substance application implement of claim 13, wherein the support arm further comprises:
   a secondary structural member coupled to and extending from one of the at least three primary structural members to another of the at least three primary structural members.

17. The agricultural substance application implement of claim 16, wherein the secondary structural member further comprises:
   a first end coupled to one of the at least three primary structural members at a first position and a second end coupled to another of the at least three primary structural members at a second position, wherein the first and the second positions are spaced apart along the longitudinal direction.

18. The agricultural substance application implement of claim 13, wherein the first surfaces of the plurality of support plates are parallel to each other.

19. The agricultural substance application implement of claim 13, wherein the third surfaces of the plurality of support plates are parallel to each other.

* * * * *